US012753726B2

(12) United States Patent
Dane et al.

(10) Patent No.: US 12,753,726 B2
(45) Date of Patent: Oct. 6, 2026

(54) ENGINE CONTROL SYSTEM, METHOD FOR CONTROLLING A DUAL FUEL ENGINE, AND NON-TRANSITORY COMPUTER-READABLE MEDIUM

(71) Applicant: Cummins Power Generation, Inc, Minneapolis, MN (US)

(72) Inventors: Marten H. Dane, Columbus, IN (US); David Joseph Reynolds, Memphis, IN (US); Daniel J. O'Connor, Columbus, IN (US); Matthew W. Isaacs, Moncks Corner, SC (US); Travis Alva Anderson, Columbus, IN (US)

(73) Assignee: Cummins Power Generation, Inc., Minneapolis, MN (US)

(*) Notice: Subject to any disclaimer, the term of this patent is extended or adjusted under 35 U.S.C. 154(b) by 0 days.

(21) Appl. No.: 19/092,959

(22) Filed: Mar. 27, 2025

(65) Prior Publication Data

US 2025/0305463 A1 Oct. 2, 2025

Related U.S. Application Data

(60) Provisional application No. 63/571,259, filed on Mar. 28, 2024.

(51) Int. Cl.
*F02D 41/00* (2006.01)
*F02D 41/02* (2006.01)
*F02D 41/14* (2006.01)

(52) U.S. Cl.
CPC ....... *F02D 41/0025* (2013.01); *F02D 41/024* (2013.01); *F02D 41/146* (2013.01); *F02D 41/1497* (2013.01)

(58) Field of Classification Search
CPC .. F02D 41/0025; F02D 41/024; F02D 41/146; F02D 41/1497; F02D 19/061; F02D 35/027; F02D 41/401
See application file for complete search history.

(56) References Cited

U.S. PATENT DOCUMENTS

| | | | |
|---|---|---|---|
| 9,249,744 | B2 | 2/2016 | Klingbeil |
| 10,018,129 | B2 | 7/2018 | Imhof et al. |

(Continued)

FOREIGN PATENT DOCUMENTS

| | | |
|---|---|---|
| WO | WO-2016/073588 A1 | 5/2016 |

OTHER PUBLICATIONS

Extended European Search Report on EP Appl. Ser. No. 25166610.3 Dated Aug. 5, 2025 (10 pages).

*Primary Examiner* — Syed O Hasan
(74) *Attorney, Agent, or Firm* — Foley & Lardner LLP

(57) ABSTRACT

An engine control system for an engine using a primary fuel and a secondary fuel is provided. The engine control system includes a controller configured to determine a first adjusted start of injection to satisfy an engine knock threshold responsive to an engine knock signal value exceeding the engine knock threshold. The controller is further configured to determine, based at least in part on the first adjusted start of injection and a target start of injection, a first adjusted substitution rate of the secondary fuel to adjust the first adjusted start of injection to the target start of injection and determine, based at least in part on the first adjusted substitution rate of the secondary fuel and a target substitution rate of the secondary fuel, an adjusted air-to-fuel ratio to adjust the first adjusted substitution rate of the secondary fuel to the target substitution rate of the secondary fuel.

12 Claims, 8 Drawing Sheets

(56) References Cited

U.S. PATENT DOCUMENTS

| | | | |
|---|---|---|---|
| 10,113,493 | B2 | 10/2018 | Atterberry et al. |
| 10,145,319 | B1 | 12/2018 | Engfehr et al. |
| 10,190,509 | B2 | 1/2019 | Lavertu et al. |
| 10,227,934 | B2 | 3/2019 | Thomas et al. |
| 10,294,884 | B2 | 5/2019 | Fritz et al. |
| 10,711,723 | B2 | 7/2020 | Thomas et al. |
| 10,815,913 | B2 | 10/2020 | Bruner et al. |
| 10,927,776 | B2 | 2/2021 | Fiveland et al. |
| 10,934,966 | B2 | 3/2021 | Anders et al. |
| 11,585,262 | B2 * | 2/2023 | Yerace .................. F02D 19/061 |
| 11,635,046 | B1 | 4/2023 | Klingbeil et al. |
| 2014/0366839 | A1 | 12/2014 | Sivasubramanian et al. |
| 2015/0219027 | A1 | 8/2015 | Zur Loye et al. |
| 2017/0089273 | A1 * | 3/2017 | Thomas .............. F02D 19/0642 |
| 2017/0234245 | A1 | 8/2017 | Bruner et al. |
| 2018/0073452 | A1 | 3/2018 | Gough et al. |
| 2018/0245527 | A1 | 8/2018 | Barta et al. |
| 2018/0298870 | A1 | 10/2018 | Dane et al. |
| 2019/0120163 | A1 * | 4/2019 | Hillebrecht ......... F02D 41/3064 |
| 2021/0301714 | A1 | 9/2021 | Klingbeil et al. |
| 2021/0404372 | A1 | 12/2021 | Klingbeil et al. |
| 2024/0337223 | A1 * | 10/2024 | Parker .................. F02D 35/023 |

* cited by examiner

ENGINE CONTROL SYSTEM, METHOD FOR CONTROLLING A DUAL FUEL ENGINE, AND NON-TRANSITORY COMPUTER-READABLE MEDIUM

CROSS-REFERENCE TO RELATED APPLICATIONS

This application claims the benefit and priority to U.S. Provisional Application No. 63/571,259, filed Mar. 28, 2024, which is incorporated herein by reference in its entirety.

TECHNICAL FIELD

The present disclosure relates generally to dual fuel internal combustion engine systems.

BACKGROUND

Dual fuel internal combustion engine systems include engines that can operate using one fuel or two different fuels. Such dual fuel engine systems can operate using a combination of a first fuel (e.g., a primary fuel), and optionally, a second fuel (e.g., a secondary fuel). The first fuel can be a liquid compression ignition fuel, such as diesel fuel. The secondary fuel can be a gaseous fuel (e.g., natural gas, bio-gas, commercially available gas, methane, ethane, propane, butane, producer gas, field gas, nominally treated field gas, well gas, nominally treated well gas, compressed natural gas, landfill gas, condensate, coal-bed methane (CBM)) or liquid fuels that are readily vaporized (e.g., gasoline, liquefied propane gas (LPG), liquefied natural gas (LNG), ethanol, methanol, etc.).

The secondary fuel can be a biofuel and/or a low carbon fuel. Biofuels and/or low carbon fuels can reduce the environmental impact of engine operation by reducing both particulate matter emissions and carbon dioxide relative to engines that operate using diesel fuel alone.

SUMMARY

One embodiment relates to an engine control system for a dual fuel engine using a primary fuel and a secondary fuel. The engine control system includes a controller. The controller is configured to, responsive to an engine knock signal value exceeding an engine knock threshold, determine a first adjusted start of injection to satisfy the engine knock threshold, in which initiation of injection adjusts a timing of injecting the primary fuel into a cylinder of the engine. The controller is configured to determine, based at least in part on the first adjusted start of injection and a target start of injection, a first adjusted substitution rate of the secondary fuel to enable the start of injection of the primary fuel to move back to the target start of injection. The controller is also configured to determine, based at least in part on the first adjusted substitution rate of the secondary fuel and a target substitution rate of the secondary fuel, an adjusted air-to-fuel ratio to adjust the first adjusted substitution rate of the secondary fuel to the target substitution rate of the secondary fuel. The controller is configured to control the engine based on the first adjusted start of injection, the first adjusted substitution rate of the secondary fuel, and the adjusted air-to-fuel ratio.

Another embodiment relates to a method including determining a first adjustment to a start of injection to satisfy an engine knock threshold for an engine, adjusting the start of injection based on the first adjustment to the start of injection, determining a first adjustment to a substitution rate of a secondary fuel to satisfy the engine knock threshold, adjusting the substitution rate of the secondary fuel based on the first adjustment to the substitution rate of the secondary fuel, determining a second adjustment to the start of injection to adjust the start of injection to approximately a target start of injection, and controlling the engine based on the first adjusted start of injection and the first adjusted substitution rate of the secondary fuel.

Another embodiment relates to a non-transitory processor-readable medium storing code representing instructions to be executed by one or more processors. The instructions include code to cause the one or more processors to determine that an engine knock level does not satisfy an engine knock threshold for an engine in a dual fuel engine system, determine a first adjustment, based at least on a difference between the first engine knock level and the engine knock threshold, to a start of injection to attain an adjusted engine knock level below the engine knock threshold, adjust the start of injection based on the first adjustment, determine a second adjustment, based at least on a difference between the start of injection and a target start of injection, to a substitution rate of a secondary fuel to initiate injection closer to the target start of injection and maintain approximately the adjusted engine knock level, adjust the substitution rate and the start of injection based on the second adjustment, determine a third adjustment, based at least on a difference between the substitution rate and a target substitution rate, to an air-to fuel ratio to attain a substitution rate closer to the target substitution rate and maintain approximately the adjusted engine knock level, and adjust the air-to-fuel ratio and the substitution rate based on the third adjustment.

It should be appreciated that all combinations of the foregoing concepts and additional concepts discussed in greater detail below are contemplated as being part of the subject matter disclosed herein. In particular, all combinations of claimed subject matter appended at the end of this disclosure are contemplated as being part of the subject matter disclosed herein.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
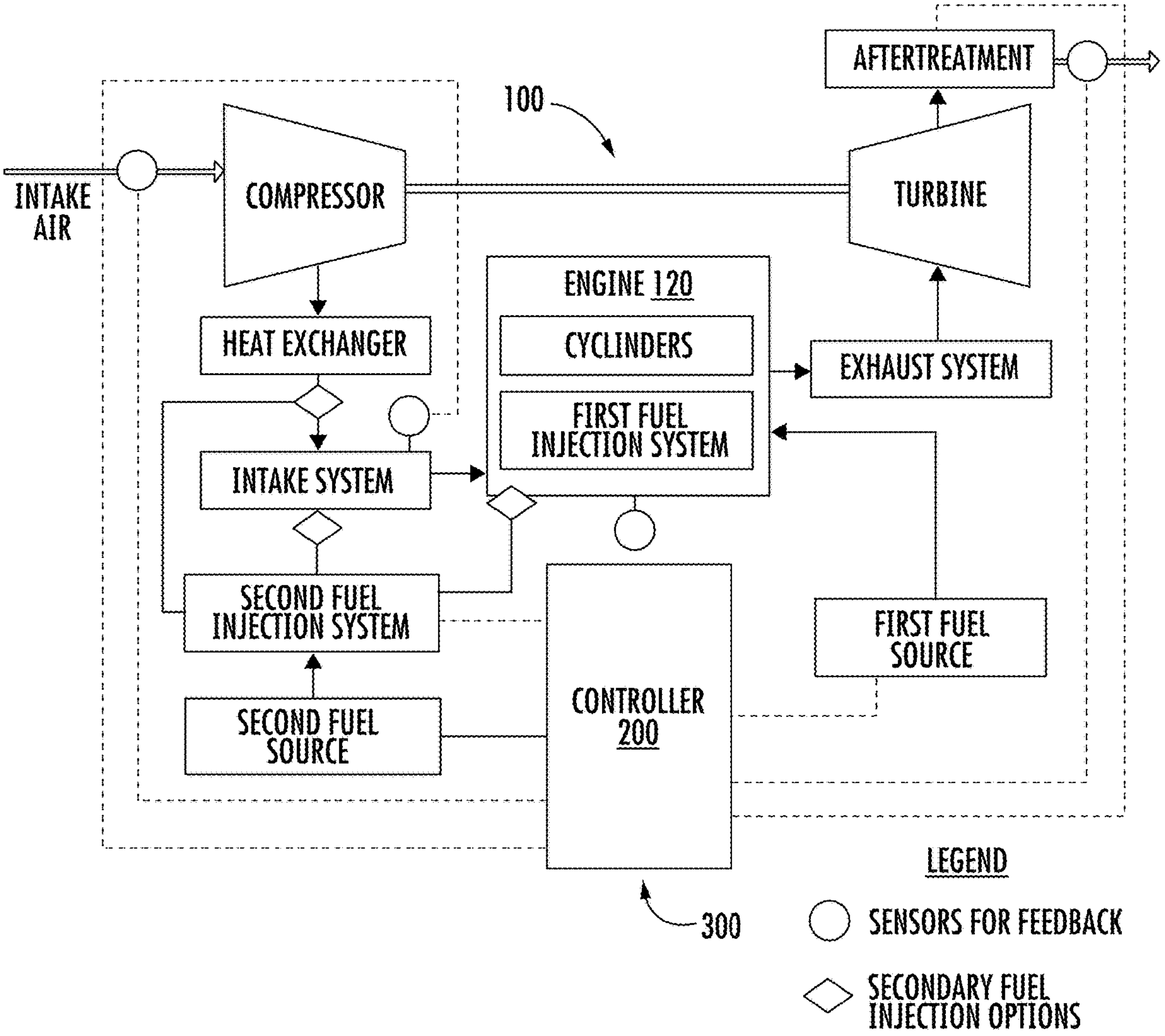
FIG. 1 is a schematic diagram of a dual fuel engine system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations can be utilized, and other changes can be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Embodiments described herein relate generally to engine control systems used in dual fuel internal combustion engine systems. The engine control system can be configured to maintain engine knock and/or nitrogen oxides (e.g., NOx) emission levels below corresponding threshold limits, while maximizing fuel economy and substitution rate of the secondary fuel, through one, or a combination of controlling injection timing (e.g., start of injection (SOI),) substitution rate of the secondary fuel (e.g., substitution rate), and air-to-fuel ratio (e.g., lambda).

The engine control system includes a controller that can use nested control loops operating at different time constants by: (i) adjusting the SOI in response to an engine knock signal value exceeding an engine knock threshold to satisfy the engine knock threshold, (ii) adjusting the substitution rate to bring the average SOI to a desired target, and (iii) adjusting lambda to bring the average substitution rate to a desired target. In some embodiments, the SOI can be adjusted to satisfy an NOx level threshold. In some embodiments, such as when injection of the secondary fuel is controlled from cycle to cycle (e.g., in dual fuel engines utilizing port fuel injection systems), the engine control system is configured to control knock in the dual fuel engine by simultaneously adjusting the substitution rate and SOI.

Among other benefits, the engine control systems and methods described herein can improve engine efficiency and increase substitution rate of the secondary fuel in a dual fuel engine. Such systems can reduce operating costs by enabling the use of low-cost and readily available secondary fuels and can reduce environmental impacts.

FIG. 1 is a schematic diagram of an exemplary dual fuel engine system 100 having various secondary fuel injection options. It should be appreciated that the illustrated configuration and components of the dual fuel engine system 100 are but one example, and that the disclosure contemplates that a variety of different engine systems and the associated components can be utilized. The dual fuel engine system 100 includes an engine 120 connected with an intake system and an exhaust system. The engine 120 is configurable as a dual fuel engine structured to operate using a primary fuel from a first fuel source and a secondary fuel from a second fuel source. In some embodiments, the engine 120 includes a lean combustion engine, such as a diesel cycle engine that uses a primary fuel, such as diesel fuel, and uses a secondary fuel, such as natural gas.

The dual fuel engine system is configured to be an engine having a dual fuel operation mode. The engine is configured to operate using two different fuels. The engine can be configured to operate using a first fuel and a second fuel, where the first fuel and the second fuel have different properties and/or chemical compositions. The properties can include auto-ignition temperatures, flame speeds, etc. The fuels can include diesel and natural gas, for example. For example, the first fuel can be a diesel fuel. The second fuel can be, for example, natural gas, an e-fuel or liquid biofuel. The liquid biofuel can be methanol and/or ethanol, for example. The first fuel or the second fuel can be any one of a high cetane number fuel, such as diesel, gas-to-liquid (GTL) diesel, heavy fuel oil (HFO), low sulfur fuel oil (LFSO), hydrotreated vegetable oil (HVO), marine gas oil (MGO), renewable diesel, biodiesel, paraffinic diesel, dimethyl ether (DME), F-76 fuel, F-34 fuel, jet A fuel, JP-4 fuel, JP-8 fuel, or oxymethylene ether (OME), or a low cetane number fuel (e.g., a high octane number fuel, a high methane number fuel). The low cetane number fuel can be natural gas, hydrogen, ethane, propane, butane, syngas, ammonia, methanol, ethanol, or gasoline. The first fuel and/or the second fuel can optionally be a blend of fuels. It should be appreciated that the foregoing are merely examples of fuels, and other types of first and second fuels are not precluded.

The dual fuel engine system 100 can power an electric power generator (e.g., genset, etc.) used to produce electricity (e.g., power), an alternator, or the like. In one embodiment, the engine 120 is coupled to the generator by, for example, a driveshaft. In other embodiments, the dual fuel engine system 100 is used in a marine application (e.g., to power a boat), a mining application (e.g., to power a haul truck and/or excavator), or a rail application (e.g., to power a locomotive). In some embodiments, the dual fuel engine system 100 powers various vehicles (e.g., an on-road or off-road vehicle). In some embodiments, the dual fuel engine system 100 is used in an industrial application to drive a pump, hydraulic system, or another type of system.

The engine 120 includes an engine block that at least partially defines one or more cylinders (collectively referred to as cylinders). The engine 120 can have any different number of cylinders (e.g., six, eight, etc.), as well as cylinders in a variety of different arrangements (e.g., in-line, "V", etc.). A piston is slidably disposed within each cylinder such that the piston reciprocates between a top-dead-center position and a bottom-dead-center position. Each cylinder, its respective piston, and the cylinder head form a combustion chamber. The cylinders are connected to the intake system to receive a charge flow and are connected to the exhaust system to release exhaust gases produced by combustion of the primary and/or secondary fuels. The dual fuel engine system 100 can also include an aftertreatment system downstream of the exhaust system. The aftertreatment system can include, for example, oxidation devices (DOC), particulate removing devices (DPF, CDPF), constituent absorbers or reducers (SCR, AMOX, LNT), reductant systems, and other components if desired.

The dual fuel engine system 100 is configured to provide dual fueling of engine 120. In some embodiments, the primary fuel and the secondary fuel are delivered via separate mechanisms. The dual fuel engine system 100 includes a first fuel injection system configured to supply the primary fuel to the cylinders, with one or more injectors at or near each cylinder. The first fuel injection system can include a first fuel source which can be, for example, a first fuel tank that is configurable to receive the primary fuel.

The second fuel injection system includes a second fuel source which can be, for example, a second fuel tank that is configured to receive the secondary fuel. In some embodiments, the second fuel injection system is configured to inject or otherwise provide the secondary fuel upstream of the engine 120. In some embodiments, the second fuel injection system is configured to inject or otherwise provide the secondary fuel directly to the cylinders. For example, the second fuel injection system can include a port injector.

The dual fuel engine system 100 includes an engine control system 300 including a controller 200. The controller 200 (e.g., a control unit, etc.) is configured to control various operational aspects of the dual fuel engine system 100. The controller 200 is configured to interpret data from various sensors disposed within the dual fuel engine system 100 and to control various components of the dual fuel engine system 100 based on the data. For example. the controller 200 can control fuel flow and/or fuel injection. In particular, the controller 200 can control the flow of the primary fuel from the first fuel source and the secondary fuel from the second fuel source.

Figure 2:
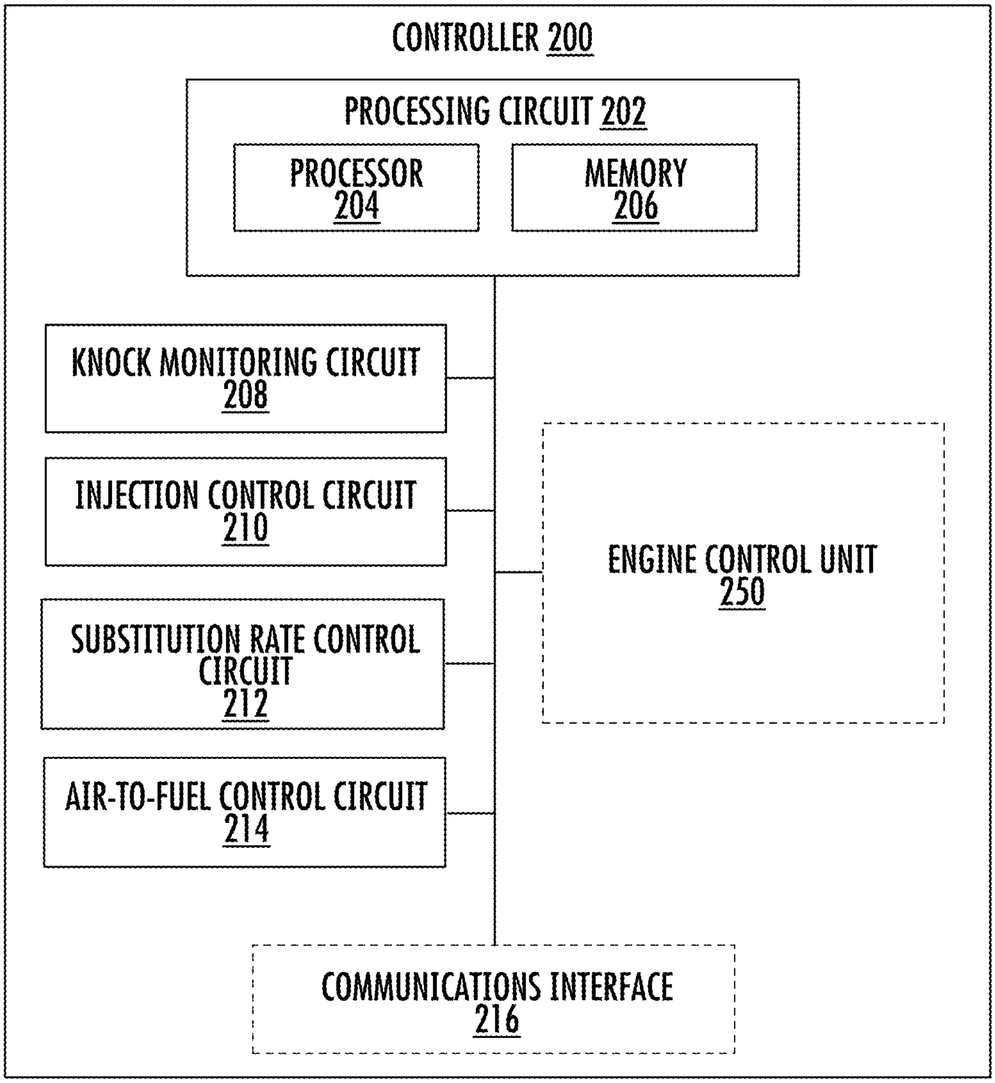
FIG. 2 is a schematic diagram of a controller for a dual fuel engine system, according to an embodiment.

FIG. 2 is a schematic diagram of the controller 200, according to an embodiment. The controller 200 can be structured as one or more electronic control units (ECUs). In some embodiments, the controller 200 includes multiple sub-controllers. In other embodiments, the controller 200 is a distributed controller. As such, the controller 200 can be separate from or included with at least one of an engine control unit 250 for the dual fuel engine system 100. The controller 200 is configured to communicate with one or more subcomponents of the dual fuel engine system 100, including through direct communication, communication over a datalink, and/or through communication with other controllers or portions of the processing subsystem that provide information to the controller 200.

The controller 200 includes a processing circuit 202 having a processor 204 and a memory 206. The controller 200 can include a knock monitoring circuit 208 to determine whether an engine knock level (e.g., value represented by one or more signals from one or more knock sensors) in the engine 120 exceeds an engine knock threshold. The engine knock threshold (e.g., knock limit, knock threshold) can be and/or be set to a value to protect the engine 120 from damage based on the one or more signals from the one or more knock sensors. The engine knock threshold can be set for a maximum individual event, frequency of events over a given value, cumulative/integrated value, or combinations thereof (e.g., with respect to various durations of time and/or cycles associated with operation of the engine 120). Many different sensors can be used, such as, but not limited to, vibration sensors (ex. accelerometer) or cylinder pressure sensors (measuring peak pressure, rate of pressure rise, amplitude of pressure ringing, etc.). For example, the engine knock threshold can include at least one of a motion threshold (e.g., to be evaluated against output from an accelerometer indicating position, velocity, and/or acceleration) or a pressure threshold (e.g., to be evaluated against peak pressure, rate of pressure rise, and/or amplitude of pressure ringing).

The controller 200 can include an injection control circuit 210 configured to determine an adjusted SOI. The controller 200 can include a substitution rate control circuit 212 configured to determine an adjusted substitution rate. The controller 200 can include an air-to-fuel control circuit 214 configured to determine an adjusted air-to-fuel ratio (e.g., lambda). In some embodiments, the controller 200 additionally includes a communications interface 216 that communicably couples the controller 200 to various other components of the dual fuel engine system 100.

In one configuration, the knock monitoring circuit 208, the injection control circuit 210, the substitution rate control circuit 212, and/or the air-to-fuel control circuit 214 are configured by computer-readable media that are executable by a processor, such as the processor 204. As described herein and amongst other uses, the circuitry facilitates performance of certain operations to enable reception and transmission of data. For example, the circuitry can provide an instruction (e.g., command, etc.) to, e.g., acquire data. In this regard, the circuitry can include programmable logic that defines the frequency of acquisition of the data and/or other aspects of the transmission of the data. In particular, the circuitry can be implemented by computer readable media which can include code written in any programming language including, but not limited to, Java, JavaScript, Python or the like and any conventional procedural programming languages, such as the "C" programming language or similar programming languages. The computer readable program code can be executed on one processor or multiple remote processors. In the latter scenario, the remote processors can be connected to each other through any type of network (e.g., a controller area network (CAN) bus, etc.).

In some embodiments, a non-transitory processor-readable medium stores code representing instructions to be executed by one or more processors 204, the instructions comprising code to cause the one or more processors 204 to: determine that an engine knock level does not satisfy an engine knock threshold for an engine 120 in a dual fuel engine system 100; determine a first adjustment, based at least on a difference between the first engine knock level and the engine knock threshold, to initiation of injection to attain an adjusted engine knock level below the engine knock threshold; adjust the start of injection based on the first adjustment; determine a second adjustment, based at least on a difference between the start of injection and a target start of injection, to a substitution rate of a secondary fuel to initiate injection closer to the target start of injection and maintain approximately the adjusted engine knock level; adjust the substitution rate and the start of injection based on the second adjustment; determine a third adjustment, based at least on a difference between the substitution rate and a target substitution rate, to an air-to fuel ratio to attain an adjusted substitution rate closer to the target substitution rate and maintain approximately the adjusted engine knock level; and adjust the air-to-fuel ratio and the substitution rate based on the third adjustment.

In some embodiments, the knock monitoring circuit 208, the injection control circuit 210, the substitution rate control circuit 212, and/or the air-to-fuel control circuit 214 are embodied as hardware units, such as electronic control units. As such, the knock monitoring circuit 208, the injection control circuit 210, the substitution rate control circuit 212, and/or the air-to-fuel control circuit 214 can be embodied as one or more circuitry components including, but not limited to, processing circuitry, network interfaces, peripheral devices, input devices, output devices, sensors, etc.

In some embodiments, the knock monitoring circuit 208, the injection control circuit 210, the substitution rate control circuit 212, and/or the air-to-fuel control circuit 214 can take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the knock monitoring circuit 208, the injection control circuit 210, the substitution rate control circuit 212, and/or the air-to-fuel control circuit 214 can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on.

The knock monitoring circuit 208, the injection control circuit 210, the substitution rate control circuit 212, and/or the air-to-fuel control circuit 214 can also include programmable hardware devices such as field programmable gate arrays, programmable array logic, programmable logic devices or the like. In this regard, the knock monitoring circuit 208, the injection control circuit 210, the substitution rate control circuit 212, and/or the air-to-fuel control circuit 214 can include one or more memory devices for storing instructions that are executable by the processor(s) of the knock monitoring circuit 208, the injection control circuit 210, the substitution rate control circuit 212, and/or the air-to-fuel control circuit 214. The one or more memory devices and processor(s) can have the same definition as provided below with respect to the memory 206 and the processor 204. Thus, in this hardware unit configuration, the knock monitoring circuit 208, the injection control circuit 210, the substitution rate control circuit 212, and/or the air-to-fuel control circuit 214 can be dispersed throughout separate locations in the engine system (e.g., as separate control units, etc.). In some embodiments, such as depicted in FIG. 2, the knock monitoring circuit 208, the injection control circuit 210, the substitution rate control circuit 212, and/or the air-to-fuel control circuit 214 can be embodied in or within a single unit/housing, shown as the controller 200.

In the example shown, the processing circuit 202 can be configured to execute or implement the instructions, commands, and/or control processes described herein with respect to one or more of the knock monitoring circuit 208, the injection control circuit 210, the substitution rate control circuit 212, or the air-to-fuel control circuit 214. Thus, the depicted configuration represents the aforementioned arrangement where one or more of the knock monitoring circuit 208, the injection control circuit 210, the substitution rate control circuit 212, or the air-to-fuel control circuit 214 are embodied as machine or computer-readable media. However, the present disclosure further contemplates embodiments where one or more of the knock monitoring circuit 208, the injection control circuit 210, the substitution rate control circuit 212, and/or the air-to-fuel control circuit 214, or at least one circuit of the knock monitoring circuit 208, the injection control circuit 210, the substitution rate control circuit 212, or the air-to-fuel control circuit 214, are configured as hardware. All such combinations and variations are intended to fall within the scope of the present disclosure.

The processor 204 can be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the processor 204 is shared by multiple circuits (e.g., the knock monitoring circuit 208, the injection control circuit 210, the substitution rate control circuit 212, and/or the air-to-fuel control circuit 214 can include or otherwise share the same processor 204 which, in some example embodiments, can execute instructions stored, or otherwise accessed, via different areas of memory 206).

Alternatively, or in combination, the processor 204 can be one of a plurality of processors that is configured to perform or otherwise execute certain operations independent of one or more co-processors. In other example embodiments, two or more processors can be coupled via a bus to enable independent, parallel, pipelined, or multi-threaded instruction execution. All such variations are intended to fall within the scope of the present disclosure.

The memory 206 (e.g., RAM, ROM, Flash Memory, hard disk storage, etc.) can store data and/or computer code for facilitating the various processes described herein. The memory 206 can be communicably connected to the processor 204 to provide computer code or instructions to the processor 204 for executing at least some of the processes described herein. Moreover, the memory 206 can be or include tangible, non-transient volatile memory or non-volatile memory. Accordingly, the memory 206 can include database components, object code components, script components, or any other type of information structure for supporting the various activities and information structures described herein.

The communications interface 216 can include wired and/or wireless interfaces (e.g., jacks, antennas, transmitters, receivers, transceivers, wire terminals, etc.) for conducting data communications with various components of the engine system. For example, the communications interface 216 can include an Ethernet card and port for sending and receiving data via an Ethernet-based communications network and/or a Wi-Fi transceiver for communicating via a wireless communications network. The communications interface 216 can be structured to communicate via local area networks or wide area networks (e.g., the Internet, etc.) and can use a variety of communications protocols (e.g., IP, local area network (LAN), controller area network (CAN), J1939, local interconnect network (LIN), Bluetooth, ZigBee, radio, cellular, near field communication, etc.).

The communications interface 216 of the controller 200 is configured to facilitate communication between and amongst the controller 200 and various components of the dual fuel engine system 100. The communications interface 216 is configured to coordinate the transmission and reception of data between the controller 200, sensors, a human-machine interface (e.g., operator input/output (I/O)), and the components of the engine system that are configured to enable control operation of fuel injection events, including the delivery of fuel to combustion chambers in the engine 120.

Certain operations described herein include operations to interpret and/or to determine one or more parameters. Interpreting or determining, as utilized herein, can include one or more of receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, receiving a value by which the interpreted parameter can be calculated, or referencing a default value that is interpreted to be the parameter value.

Figure 3:
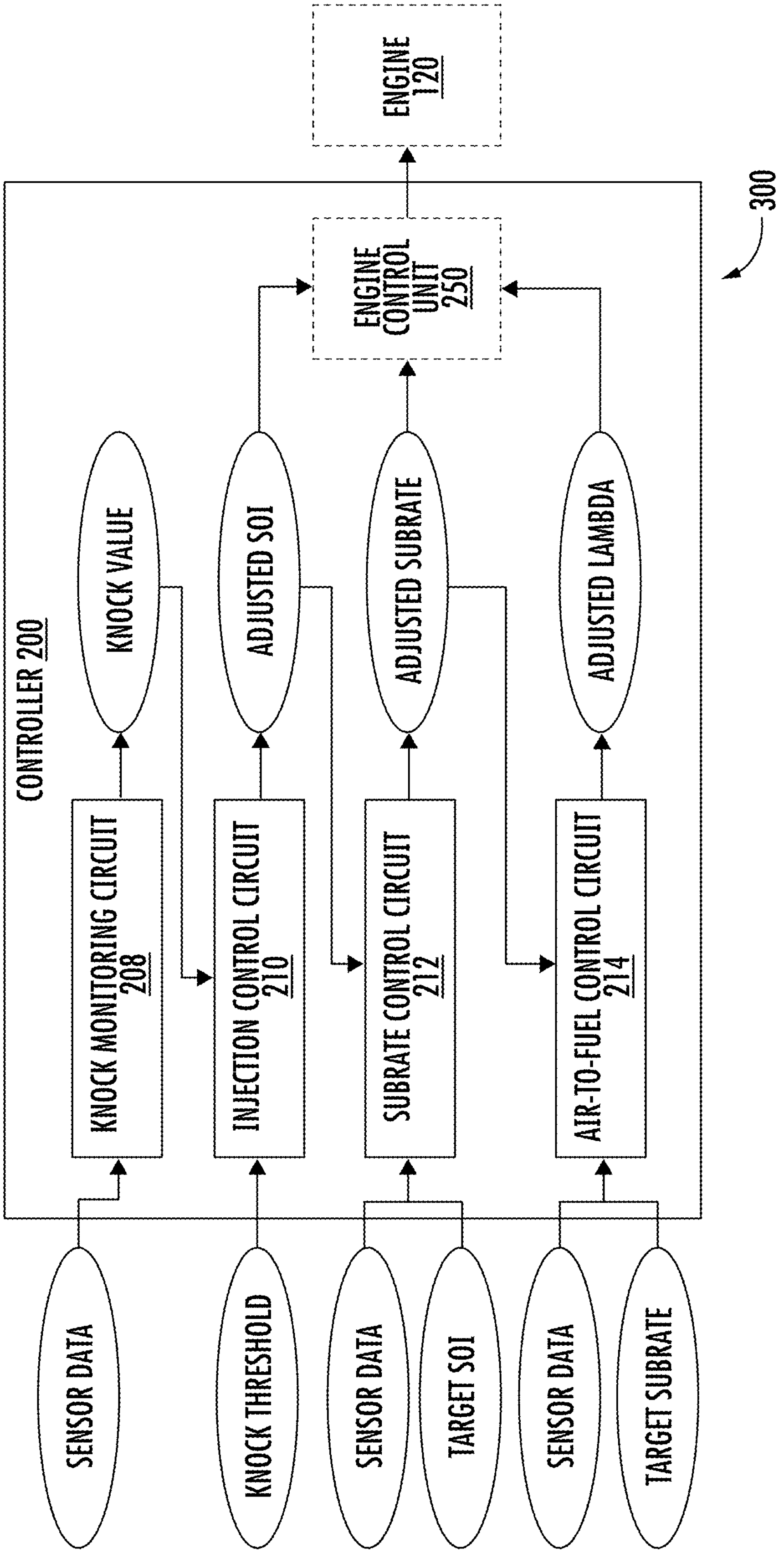
FIG. 3 is a schematic diagram of an engine control system for the dual fuel engine system of FIG. 1, according to an embodiment.

FIG. 3 is a schematic diagram of the engine control system 300 of the dual fuel engine system 100, according to an embodiment. The engine control system 300 is configured to control operations of the engine 120, and includes the controller 200. The controller 200 can determine a first adjusted start of injection to satisfy an engine knock threshold responsive to an engine knock signal value exceeding the engine knock threshold, in which initiation of injection adjusts a timing of injecting the primary fuel into a cylinder of the engine 120. The controller 200 can determine, based at least in part on the first adjusted start of injection and a target start of injection, a first adjusted substitution rate of the secondary fuel to adjust the first adjusted start of injection to the target start of injection. For example, the controller 200 can determine the first adjusted substitute rate to enable the start of injection of the primary fuel to be moved back to the target start of injection. The controller 200 can determine, based at least in part on the first adjusted substitution rate of the secondary fuel and a target substitution rate of the secondary fuel, an adjusted air-to-fuel ratio to adjust the first adjusted substitution rate of the secondary fuel to the target substitution rate of the secondary fuel. The controller 200 can control the engine 120 based on the first adjusted start of injection, the first adjusted substitution rate of the secondary fuel, and the adjusted air-to-fuel ratio.

In some embodiments, the first adjusted start of injection delays an average start of injection and reduces engine knock. For example, the delaying of the start of injection can allow for a more effective air-to-fuel ratio, which can reduce engine knock and/or reduce the likelihood of engine knock. In some embodiments, the first adjusted substitution rate of the secondary fuel can decrease an average substitution rate of the secondary fuel and advances the average start of injection. In some embodiments, the adjusted air-to-fuel ratio can increase an average air-to-fuel ratio and increases the average substitution rate of the secondary fuel. In some embodiments, the engine control system can further include a port fuel injection system configured to adjust the start of injection and a substitution rate of the secondary fuel concurrently to satisfy the engine knock threshold.

In some embodiments, the first adjusted start of injection can also be determined to satisfy a $NO_X$ level threshold. For example, the controller 200 can monitor a $NO_X$ level (e.g., as a value of a signal from a $NO_X$ sensor coupled with the exhaust system depicted in FIG. 1, such as by operation of the knock monitoring circuit 208 as described below with reference to FIG. 3), can compare the value to the $NO_X$ level threshold, and can generate the control signal for the timing of injection based at least on the comparison (e.g., to trigger a change in the timing of injection responsive to the value being greater than the $NO_X$ level threshold). In some embodiments, the controller 200 can determine an adjusted target start of injection to adjust an exhaust temperature of the engine 120 to be within a target exhaust temperature range. For example, the target exhaust temperature range can include at least one of a lower temperature threshold and an upper temperature threshold. The controller 200 can monitor the exhaust temperature (e.g., using a signal from a temperature sensor coupled with the exhaust system depicted in FIG. 1), can compare the exhaust temperature to the at least one of the lower temperature threshold and the upper temperature threshold, and can generate the control signal for the timing of injection based at least on the comparison (e.g., to trigger a change in the timing of injection responsive to the exhaust temperature being greater than the upper temperature threshold and/or less than the lower temperature threshold).

In some embodiments, the controller 200 can determine the first adjusted substitute rate of the secondary fuel to satisfy one or more objectives with respect to at least one of an average substitution rate of the secondary fuel or a brake thermal efficiency. The average substitute rate can be the substitution rate averaged over one or more cycles of secondary fuel injection. The brake thermal efficiency can correspond to an amount of power from the engine 120 (e.g., as applied to a shaft or remote component coupled with the engine 120) relative to an amount of power from the combustion of the fuel(s) in the engine 120. The one or objectives can include at least one of a measure of the substitution rate and/or average substitution rate, such as for increasing the average substitution rate (which can allow for more efficient overall fuel usage). The one or more objectives can include at least one of a measure of the brake thermal efficiency, such as for increasing the brake thermal efficiency. In some embodiments, the controller 200 can determine the first adjusted substitution rate of the secondary fuel based on maximizing an average substitution rate of the secondary fuel or maximizing the brake thermal efficiency.

Referring to FIG. 3, the knock monitoring circuit 208 can be configured to monitor engine knock values, such as a current engine knock level or average knock level. In some embodiments, the knock monitoring circuit 208 is configured to monitor other engine operating parameters that are indicative of engine knock.

The knock monitoring circuit 208 is configured to receive sensor input (e.g., sensor data from a sensor or combination of sensors suitable to provide an output of current engine knock value). For example, the start of injection control circuit 210 can receive sensor data from one or more knock sensors, knock vibration sensors, temperature sensors, and/or in-cylinder pressure sensors, among other sensors. For example, the knock sensor can be mounted in the engine 120 or on an intake manifold of the intake system. In some embodiments, engine knock values can correspond to a current, actual, predicted, or estimated engine knock level associated with the operation of the engine 120.

The knock monitoring circuit 208 is also configured to receive operating parameters including the target engine knock value (e.g., engine knock threshold). The engine knock threshold value can be a predetermined threshold engine knock level(s) or range(s). In some embodiments, the target engine knock level(s) or range(s) can be adjusted based on factors such as engine load, engine speed, and/or the like.

Responsive to the engine knock value exceeding the engine knock threshold, the injection control circuit 210 can determine an adjusted start of injection such that engine knock being generated by operation of the engine 120 can be closer to, within, and/or below the engine knock threshold. In some embodiments, the injection control circuit 210 can adjust injection timing to attain a target NOx level. In some embodiments, the injection control circuit 210 determines adjustments to start of injection based at least in part on the difference between the engine knock value and the engine knock threshold. For example, the injection control circuit 210 can compare and evaluate engine knock values with a target engine knock value (e.g., knock threshold, such as engine knock threshold, etc.).

For example, the injection control circuit 210 can determine an adjustment to the start of injection that can bring engine knock values closer to the engine knock threshold. The adjustment can include advancing or delaying the start of injection so as to either reduce (or increase, such as in a manner that allows for other parameters, such as substitution rate, to be increased or otherwise improved) the level of knock being generated by operation of the engine 120. In some embodiments, the adjusted start of injection delays the average start of injection and reduces engine knock. The injection control circuit 210 provides commands (e.g., electronic control signals) that can be used to adjust the operation of certain components of the engine 120 and/or dual fuel engine system, 100 to effectuate adjustments to the start of injection.

The substitution rate control circuit 212 is configured to determine an adjusted substitution rate to bring the adjusted start of injection back to a target level or value. The substitution rate control circuit 212 is configured to receive operating parameters including the target start of injection. In some embodiments, the target start of injection is determined based on desired performance parameters of the engine 120. The performance parameters can include at least one of a target emission level or a target fuel efficiency.

The substitution rate control circuit 212 can receive a sensor input (e.g., sensor data from a sensor or combination of sensors suitable to provide an output of current substitution rate). For example, the substitution rate can be calculated from the fuel rate of the primary fuel and the fuel rate of the secondary fuel. In some embodiments, the sensor data can be indicative of a substitution rate of the secondary fuel, a fueling rate of the primary, a fueling rate of the secondary fuel, or another parameter indicative of a mixed fuel composition. Substitution rate can correspond to a current, actual, predicted, or estimated substitution rate associated with the operation of the engine 120.

The substitution rate control circuit 212 determines the adjusted substitution rate at least in part on the difference between the adjusted start of injection and the target start of injection. For example, the substitution rate control circuit 212 can determine an adjustment to the substitution rate such that the start of injection is closer to the target start of injection while maintaining engine knock values satisfying the engine knock threshold. In some embodiments, the adjusted substitution rate decreases the average substitution rate and advances the average start of injection.

The substitution rate control circuit 212 provides commands to modify operation of one or more components of the engine 120 and/or the dual fuel engine system 100 to effectuate adjustments to the substitution rate. In some embodiments, the substitution rate control circuit 212 provides commands that are used to adjust the operation of certain components of the engine 120 and/or dual fuel engine system 100 to effectuate adjustments to the start of injection bringing the adjusted start of injection closer to the target start of injection. In some embodiments, the engine control system 300 includes a port fuel injection system that allows adjustment of the start of injection and substitution rate concurrently to satisfy the engine knock threshold.

The air-to-fuel control circuit 214 can determine an adjusted air-to-fuel ratio, such as to cause a decrease in a difference between the adjusted substitution rate and a target value for the substitution rate (e.g., to bring the adjusted substitution rate back to a target level or value). The air-to-fuel control circuit 214 is configured to receive operating parameters including the target substitution rate. In some embodiments, a higher target substitution rate of secondary fuel can be provided to reduce the operational cost and/or environmental impact of the dual fuel engine system 100. In some embodiments, the target substitution rate is determined based upon engine load information, intake manifold temperature information, and gaseous fuel quality information. For example, the target substitution rate can be determined based on tables which include a plurality of discrete substitution rate values as a function of the engine load information, the intake manifold temperature information, and the gaseous fuel quality information.

The air-to-fuel control circuit 214 can receive sensor input (e.g., sensor data from a sensor or combination of sensors suitable to provide an output of current air-to-fuel ratio). For example, air-to-fuel ratio (lambda, e.g., as depicted with lines of fixed lambda in relation to average SOI and average substitution rate in FIG. 6) can be calculated based on the air flow rate and fuel flow rate. In some embodiments, the sensor data can be indicative of a flow rate (e.g., a volumetric flow rate, a mass flow rate, etc.) of the charge air, the air-fuel charge, and/or the secondary fuel. In some embodiments, the sensor data can be indicative of a temperature of the charge air, a pressure of the charge air, the air-fuel charge, and/or the secondary fuel. In some embodiments, the sensor data is indicative of a composition of the air-fuel mixture. Lambda can correspond to a current, actual, predicted, or estimated lambda associated with the operation of the engine 120.

The air-to-fuel control circuit 214 determines the adjusted air-to-fuel ratio at least in part on the difference between the adjusted substitution rate and the target substitution rate. For example, the air-to-fuel control circuit 214 can determine an adjustment to the air-to-fuel ratio to cause a decrease in a difference between the substitution rate and the target substitution rate (e.g., such that the substitution rate is closer to the target substitution rate); the air-to-fuel control circuit 214 can determine the adjustment to control the substitution rate while maintaining the engine knock value below the engine knock threshold. In some embodiments, the adjusted air-to-fuel ratio increases the average air-to-fuel ratio and increases the average substitution rate. Therefore, substitution rate can be controlled to the highest attainable substitution rate for the engine operating conditions.

The air-to-fuel control circuit 214 provides commands to modify the operation of one or more components of the engine 120 and/or dual fuel engine system 100, such as to effectuate adjustments to lambda. For example, the air-to-fuel control circuit 214 can provide commands that adjust the amount of air (or fuel) that is added into the charge flow and/or the amount of air (or fuel that is delivered into the combustion chamber, by controlling one or more of an intake throttle, variable valve timing, turbocharger (e.g., variable-geometry turbocharger (VGT), wastegate turbocharger (WGT)), or various combinations thereof, and thereby adjust the air-to-fuel ratio to be richer or leaner.

In some embodiments, the engine control system 300 is configured to adjust the target of start of injection to increase or decrease exhaust temperature and/or aftertreatment temperature. In such embodiments, targeting aftertreatment temperatures within a specified range can be desirable to provide sufficient catalytic activity in an aftertreatment system, thus decreasing emissions.

In some embodiments, such as where lambda control is not available, the engine control system 300 can (i) reduce substitution rate, or (ii) reduce brake thermal energy (BTE)

of the engine 120. For example, reducing substitution rate can allow for increased BTE, and/or reducing BTE can allow for increased substitution rate. In some embodiments, the controller 200 is configured to determine whether to improve substitution rate or BTE based on user input.

Figure 4:
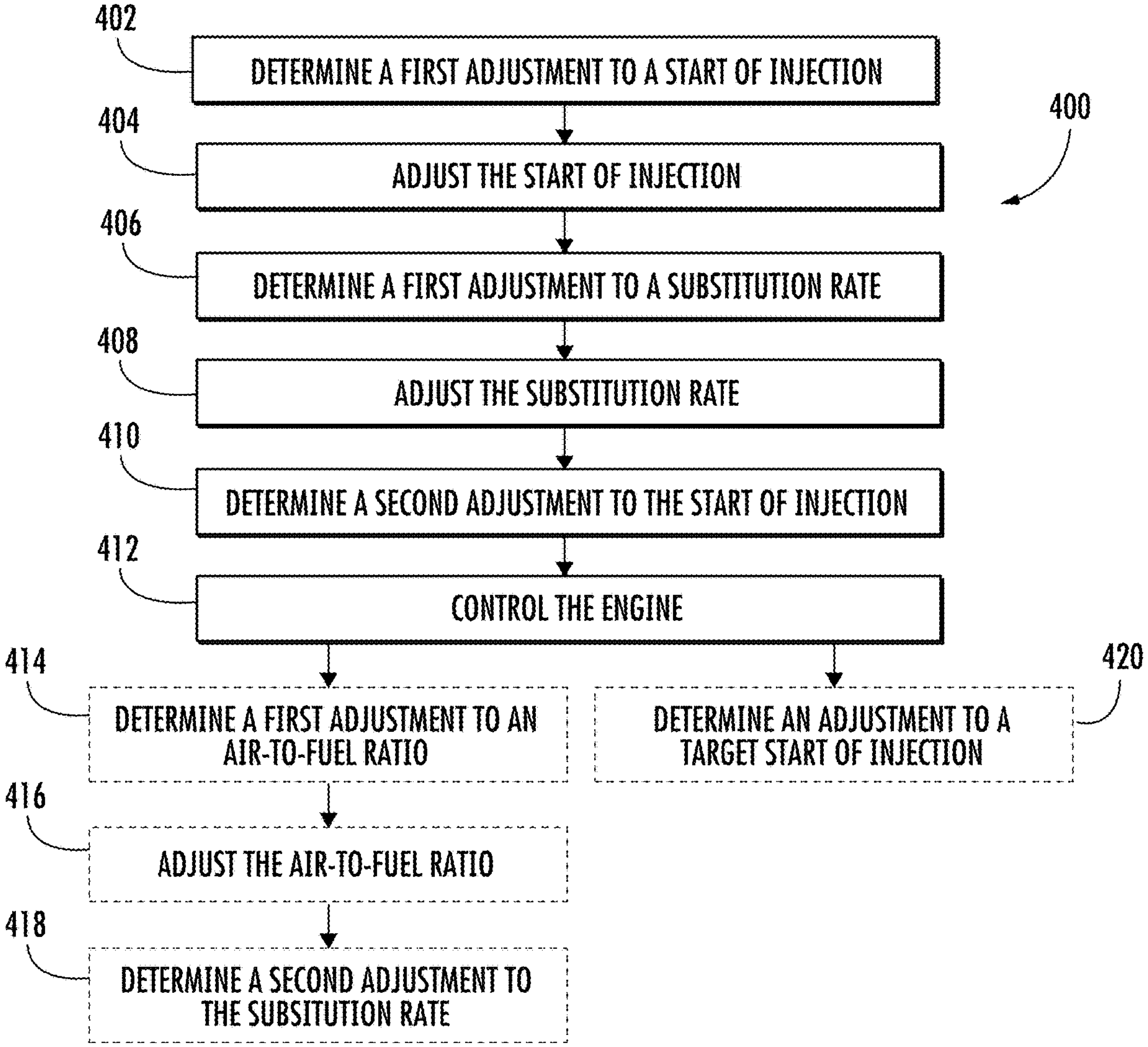
FIG. 4 a flow diagram of a method for controlling a dual fuel engine system, according to an embodiment.

FIG. 4 shows a flow diagram of a method 400 of controlling a dual fuel engine system 100. The method 400 can be implemented on any dual fuel engine system described herein, such as dual fuel engine system 100 described with reference to FIGS. 1-3. The method 400 includes: determining a first adjustment to initiation of injection to satisfy an engine knock threshold for an engine, adjusting the start of injection based on the first adjustment to the start of injection; determining a first adjustment to a substitution rate of a secondary fuel to satisfy the engine knock threshold; adjusting the substitution rate of the secondary fuel based on the first adjustment to the substitution rate of the secondary fuel; determining a second adjustment to the start of injection to adjust the start of injection to approximately a target start of injection; and controlling the engine based on the first adjusted start of injection and the first adjusted substitution rate of the secondary fuel.

In some embodiments, the method 400 can further include determining, based on a target substitution rate of the secondary fuel and the engine knock threshold, a first adjustment to an air-to-fuel ratio; adjusting the air-to-fuel ratio based on the first adjustment to the air-to-fuel ratio; and determining a second adjustment to the substitution rate of the secondary fuel to adjust the substitution rate of the secondary fuel to correspond approximately the target substitution rate of the secondary fuel.

In some embodiments, the method 400 can further include determining an adjustment to the target start of injection to adjust an exhaust temperature of the engine 120 to be within a target range of the exhaust temperature. In some embodiments, the adjustment to the target start of injection can delay combustion to increase the exhaust temperature. In some embodiments, determining the first adjustment to the substitution rate of the secondary fuel can be based on maximizing the substitution rate of the secondary fuel. In some embodiments, determining the first adjustment to the substitution rate of the secondary fuel can be based on maximizing a brake thermal efficiency.

Operation 402 includes determining a first adjustment to the start of injection to satisfy an engine knock threshold for an engine. Operation 402 can include utilizing information (e.g., signals, etc.) indicating difference between the engine knock value and the engine knock threshold to determine the first adjustment to the start of injection such that engine knock being generated by operation of the engine 120 is generally closer to, within, and/or below the engine knock threshold. In some embodiments, the injection control circuit 210 is also configured to adjust injection timing to attain a target NOx level. In some embodiments, the injection control circuit 210 determines adjustments to start of injection based at least in part on the difference between the engine knock value and the engine knock threshold.

Operation 404 includes adjusting the start of injection. Operation 404 can include communicating instructions to an engine control unit to implement and adjust the start of injection. For example, the engine control unit can receive the instructions, extract, from the instructions, an indication to delay or advance the start of injection, and cause the adjustment to the start of injection by controlling the operation of one or more components of the engine 120 and/or dual fuel engine system 100.

Operation 406 includes determining a first adjustment to the substitution rate of the secondary fuel to satisfy the engine knock threshold. Operation 406 can include utilizing information indicating difference between the adjusted start of injection and the target start of injection to determine an adjustment to the substitution rate. In particular, an adjustment can be performed such that the start of injection is closer (sooner) to the target start of injection while maintaining engine knock values satisfying the engine knock threshold.

In some embodiments, the first adjustment to the substitution rate is based on maximizing the substitution rate. In some embodiments, the first adjustment to the substitution rate is based on maximizing a brake thermal efficiency of the engine 120.

Operation 408 includes adjusting the substitution rate. Operation 408 can include communicating instructions to an engine control unit to implement and adjust the substitution rate. For example, the engine control unit can receive the instructions, extract, from the instructions, an indication to increase or decrease the substitution rate, and cause the adjustment to the substitution rate by controlling the operation of one or more components of the engine 120 and/or dual fuel engine system 100. For example, the determination of the first adjusted substitution rate of the secondary fuel can enable the start of injection of the primary fuel to move/be moved back to the target start of injection.

Operation 410 includes determining a second adjustment to the start of injection to adjust the start of injection to approximately the target start of injection. Operation 410 can include utilizing information based on the first adjustment to the substitution rate implemented to satisfy the engine knock threshold to determine the second adjustment to the start of injection. Operation 412 includes controlling the engine based on the first adjusted start of injection and the first adjusted substitution rate. In some embodiments, operation 412 can optionally proceed to operation 414, or operation 420.

Operation 414 includes determining a first adjustment to the air-to-fuel ratio based on the target substitution rate and the engine knock threshold. Operation 416 includes adjusting the air-to-fuel ratio based on the first adjustment to the air-to-fuel ratio. Operation 416 can include communicating instructions to an engine control unit to implement and adjust the air-to-fuel ratio. For example, the engine control unit can receive the instructions, extract, from the instructions, an indication to increase or decrease the air-to-fuel ratio, and cause the adjustment to the air-to-fuel ratio by controlling the operation of one or more components of the engine 120 and/or dual fuel engine system 100. Operation 418 includes determining a second adjustment to the substitution rate to adjust the substitution rate to approximately the target substitution rate.

Operation 420 includes determining an adjustment to the target start of injection to adjust an exhaust temperature of an engine to be within a target range of the exhaust temperature. In some embodiments, the adjustment to the target start of injection delays combustion in the engine 120. This in turn increases the exhaust temperature. The first adjustment to the air-to-fuel ratio further increases the exhaust temperature.

FIGS. 5-12 illustrate graphical representations of a method of controlling a dual fuel engine system, according to various embodiments. The methods can be implemented on any of the dual fuel engine systems described herein, such as the dual fuel engine system 100 of FIG. 1. While FIGS. 5-12 are discussed below with respect to adjustments that are based on engine knock levels (e.g., responsive to monitoring of engine knock), the methods shown can apply in a similar manner for controlling $NO_X$ levels (e.g., responsive to monitoring $NO_X$ levels prior to, simultaneous with, and/or subsequent to monitoring of engine knock in any of various cycles of operation).

Figure 5:
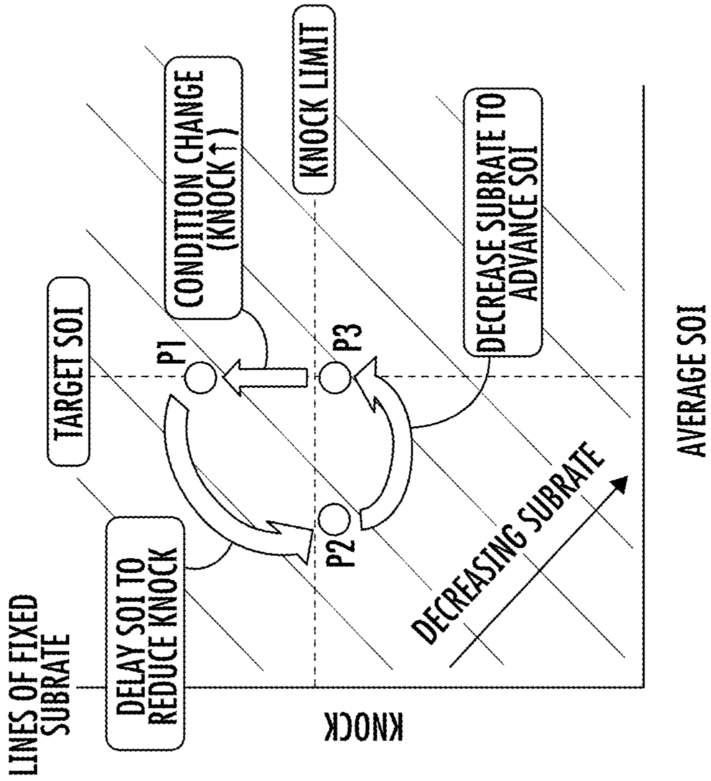
FIG. 5 is a graphical representation of a method of controlling a dual fuel engine system, according to an embodiment.
Figure 6:
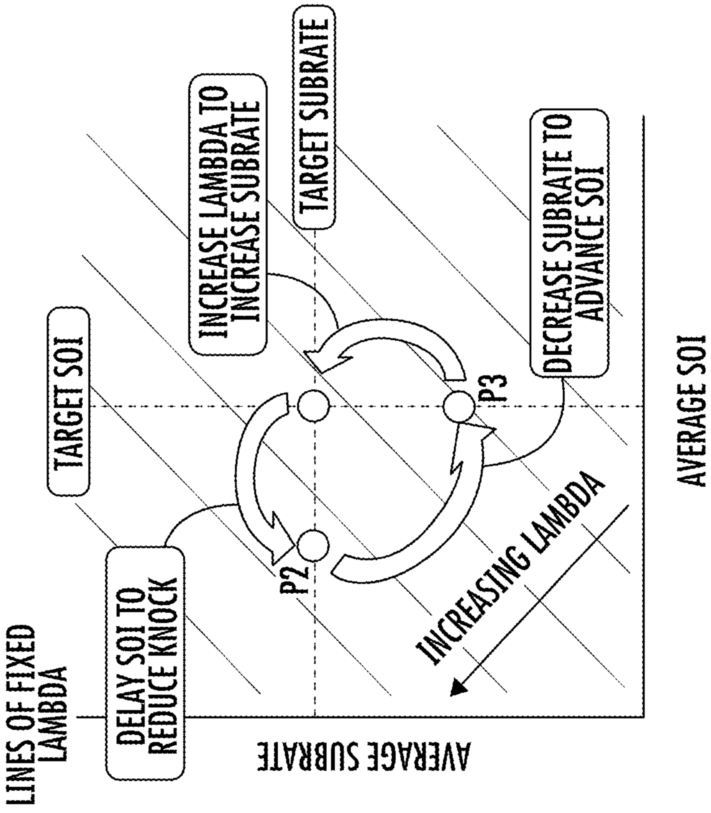
FIG. 6 is a graphical representation of the method of FIG. 5.

The method shown in FIGS. 5 and 6 can include controlling a start of injection, a substitution rate, and an air-to-fuel ratio of a dual fuel engine system. At operating point P1, the engine knock level exceeds the engine knock threshold ("knock limit"). In response to the engine knock level exceeding the knock limit, the start of injection is adjusted to be delayed, reducing the engine knock level to satisfy the engine knock threshold. At operating point P2, the substitution rate is decreased to bring the start of injection back to a target start of injection, while maintaining the engine knock level at or around the engine knock threshold. At operating point P3, the air-to-fuel ratio is increased to bring the substitution rate to a target substitution rate, while maintaining the engine knock level at or around the engine knock threshold. Thus, the start of injection can be returned to a target start of injection. Further, the substitution rate can be returned to a target substitution rate while the engine knock level remains around, or below the engine knock threshold.

Figure 7:
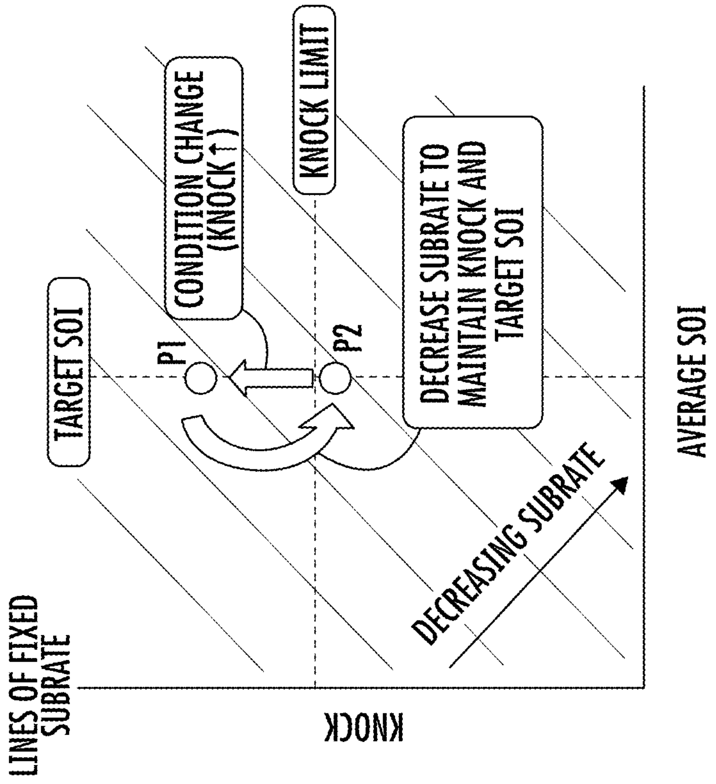
FIG. 7 is a graphical representation of a method of controlling a dual fuel engine system, according to another embodiment.
Figure 8:
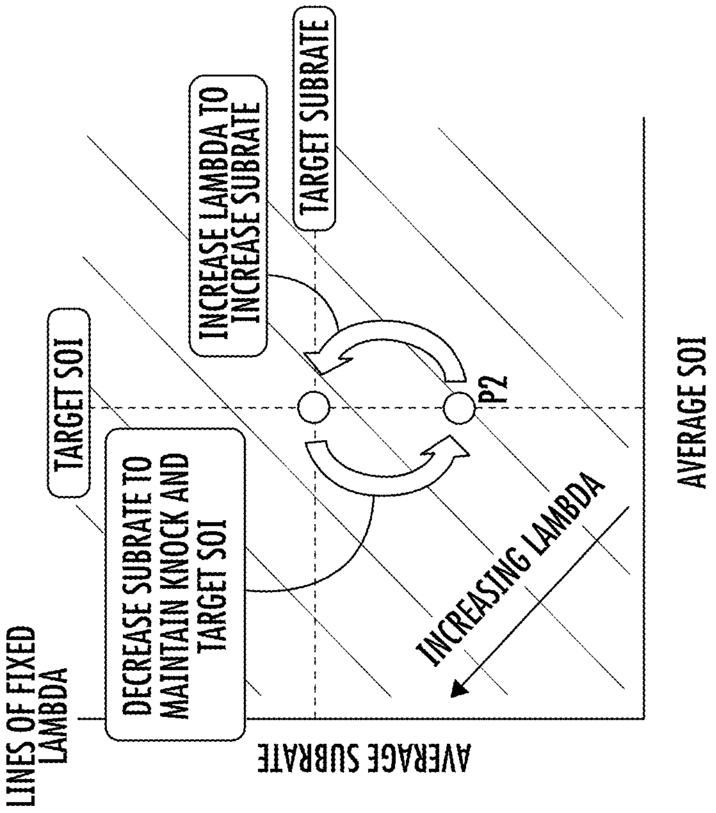
FIG. 8 is a graphical representation of the method of FIG. 7.

FIGS. 7 and 8 depict a method implemented for a dual fuel engine system including a port fuel injection system. The method shown in FIGS. 7 and 8 is similar to that shown in FIGS. 5 and 6. At operating point P1, the engine knock level exceeds the engine knock threshold ("knock limit"). At operating point P2, the port fuel injection system allows for simultaneous adjustment of the start of injection and the substitution rate to reduce the engine knock level to satisfy the engine knock threshold.

Figure 9:
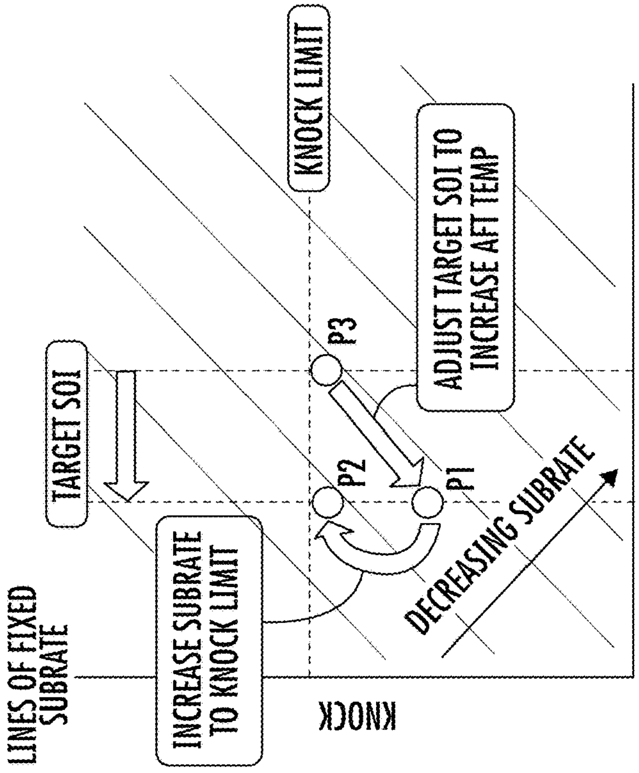
FIG. 9 is a graphical representation of a method of controlling a dual fuel engine system, according to another embodiment.
Figure 10:
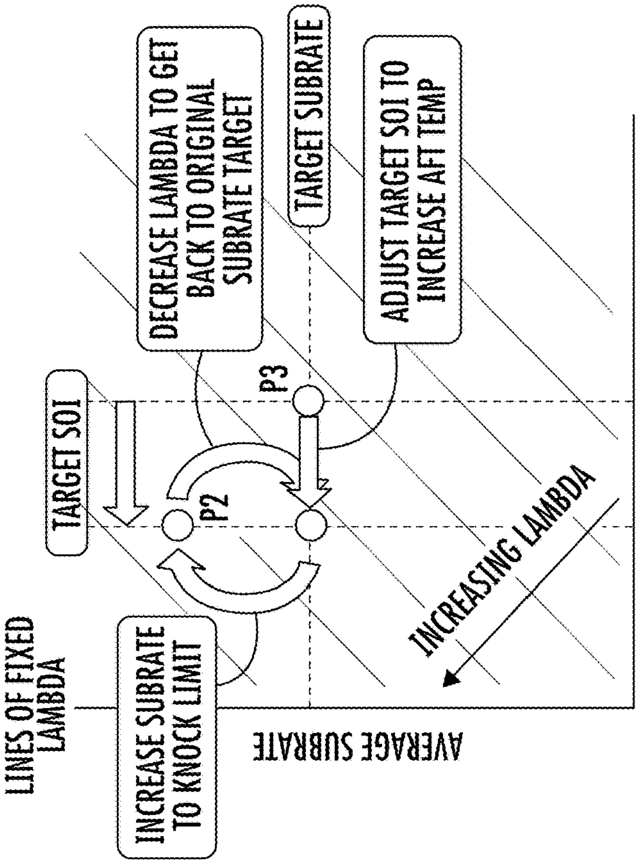
FIG. 10 is a graphical representation of the method of FIG. 9.

The method shown in FIGS. 9 and 10 include controlling a start of injection, a substitution rate, an air-to-fuel ratio of a dual fuel engine system, and a target start of injection. At operating point P1, the target start of injection is adjusted to increase an aftertreatment temperature. At operating point P2, the substitution rate is increased, while maintaining a knock level satisfying the engine knock threshold. At operating point P3, the air-to-fuel ratio is decreased to return the substitution rate to a target substitution rate.

Figure 11:
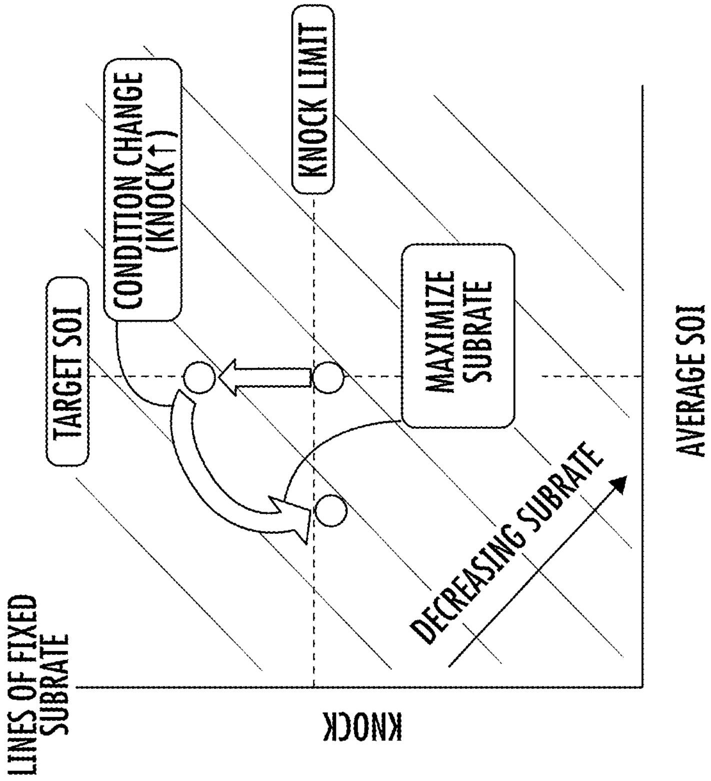
FIG. 11 is a graphical representation of a method of controlling a dual fuel engine system, according to another embodiment.
Figure 12:
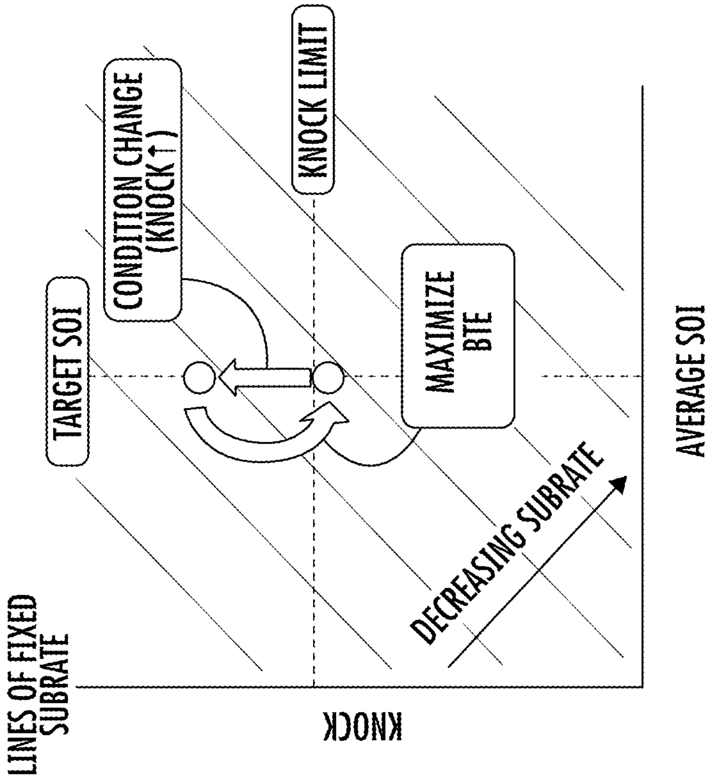
FIG. 12 is a graphical representation of a method of controlling a dual fuel engine system, according to another embodiment.

The methods shown in FIGS. 11 and 12 can provide methods of reducing engine knock in the absence of air-to-fuel ratio control. The method shown in FIG. 11 includes increasing a substitution rate of a dual fuel engine system. For example, the substitution rate can be maximized. To reduce engine knock, substitution rate is increased while BTE decreases. The method shown in FIG. 12 includes increasing BTE in a dual fuel engine system. For example, the BTE can be maximized. To reduce engine knock, BTE is increased while substitution rate decreases.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining can be stationary (e.g., permanent) or moveable (e.g., removable or releasable). Such joining can be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although certain embodiments have been described in detail in this disclosure, those skilled in the art who review this disclosure will readily appreciate that various modifications are possible without materially departing from the novel teachings and advantages of the subject matter described herein. Other substitutions, modifications, changes and omissions can also be made in the design and arrangement of the various exemplary embodiments without departing from the scope of the embodiments described herein.

While this specification contains specific implementation details, these should not be construed as limitations on the scope of any embodiment or of what can be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

What is claimed is:

1. An engine control system for an engine using a primary fuel and a secondary fuel, the engine control system comprising:

a controller configured to:

determine a first adjusted start of injection to satisfy an engine knock threshold responsive to an engine knock signal value exceeding the engine knock threshold, in which initiation of injection adjusts a timing of injecting the primary fuel into a cylinder of the engine, wherein the first adjusted start of injection is also determined to satisfy a NOx level threshold;

determine, based at least in part on the first adjusted start of injection and a target start of injection, a first adjusted substitution rate of the secondary fuel to adjust the first adjusted start of injection to the target start of injection;

determine, based at least in part on the first adjusted substitution rate of the secondary and a target substitution rate of the secondary fuel, an adjusted air-to-fuel ratio to adjust the first adjusted substitution rate of the secondary fuel to the target substitution rate of the secondary fuel; wherein an adjustment to the target start of injection is determined to adjust an exhaust temperature of the engine to be within a target range of the exhaust temperature; and control the engine based on the first adjusted start of injection, the first adjusted substitution rate of the secondary fuel, and the adjusted air-to-fuel ratio.

2. The engine control system of claim 1, wherein the first adjusted start of injection delays an average start of injection and reduces engine knock.

3. The engine control system of claim 2, wherein the first adjusted substitution rate of the secondary fuel decreases an average substitution rate of the secondary fuel and advances the average start of injection.

4. The engine control system of claim 3, wherein the adjusted air-to-fuel ratio increases an average air-to-fuel ratio and increases the average substitution rate of the secondary fuel.

5. The engine control system of claim 1, further comprising a port fuel injection system configured to adjust the start of injection and a substitution rate of the secondary fuel concurrently to satisfy the engine knock threshold.

6. The engine control system of claim 1, wherein the controller is further configured to determine the first adjusted substitution rate of the secondary fuel based on maximizing an average substitution rate of the secondary fuel or maximizing a brake thermal efficiency.

7. A method for controlling an engine configured to receive a primary fuel and a secondary fuel, the method comprising:

determining a first adjustment to a start of injection to satisfy an engine knock threshold and a NOx level threshold for the engine;

adjusting the start of injection based on the first adjustment to the start of injection;

determining a first adjustment to a substitution rate of the secondary fuel to satisfy the engine knock threshold;

adjusting the substitution rate of the secondary fuel based on the first adjustment to the substitution rate of the secondary fuel;

determining, based on the first adjustment to the substitution rate of the secondary fuel, a second adjustment to the start of injection to adjust the start of injection to approximately a target start of injection, wherein an adjustment to the target start of injection is determined to adjust an exhaust temperature of the engine to be within a target range of the exhaust temperature;

and controlling the engine based on the first adjustment to the start of injection, the first adjustment to the substitution rate of the secondary fuel, and the second adjustment to the start of injection.

8. The method of claim 7, further comprising:

determining, based on a target substitution rate of the secondary fuel and the engine knock threshold, a first adjustment to an air-to-fuel ratio;

adjusting the air-to-fuel ratio based on the first adjustment to the air-to-fuel ratio; and determining a second adjustment to the substitution rate of the secondary fuel to adjust the substitution rate of the secondary fuel to approximately the target substitution rate of the secondary fuel.

9. The method of claim 7, wherein the adjustment to the target start of injection delays combustion to increase the exhaust temperature.

10. The method of claim 7, wherein determining the first adjustment to the substitution rate of the secondary fuel is based on maximizing the substitution rate of the secondary fuel.

11. The method of claim 7, wherein determining the first adjustment to the substitution rate of the secondary fuel is based on maximizing a brake thermal efficiency.

12. A non-transitory processor-readable medium storing code representing instructions to be executed by one or more processors, the instructions comprising code to cause the one or more processors to:

determine that an engine knock level does not satisfy an engine knock threshold for an engine in a dual fuel engine system, determine a first adjustment, based at least on a difference between the engine knock level and the engine knock threshold and based on a NOx level threshold, to a start of injection to attain an adjusted engine knock level below the engine knock threshold;

adjust the start of injection based on the first adjustment;

determine a second adjustment, based at least on a difference between the start of injection and a target start of injection, to a substitution rate of a secondary fuel to initiate injection closer to the target start of injection and maintain approximately the adjusted engine knock level;

adjust the substitution rate and the start of injection based on the second adjustment;

determine a third adjustment, based at least on a difference between the substitution rate and a target substitution rate, to an air-to fuel ratio to attain an adjusted substitution rate closer to the target substitution rate and maintain approximately the adjusted engine knock level; wherein an adjustment to the target start of injection is determined to adjust an exhaust temperature of the engine to be within a target range of the exhaust temperature; and adjust the air-to-fuel ratio and the substitution rate based on the third adjustment.

* * * * *